United States Patent [19]

Fleischer

[11] Patent Number: 5,382,481

[45] Date of Patent: Jan. 17, 1995

[54] SOLID STATE ELECTROCHEMICAL CELL CONTAINING A PROTON-DONATING AROMATIC COMPOUND

[75] Inventor: Niles A. Fleischer, Rehovot, Israel

[73] Assignee: E.C.R.-Electro-Chemical Research Ltd., Yavne, Israel

[21] Appl. No.: 128,497

[22] Filed: Sep. 7, 1993

[51] Int. Cl.⁶ .............................................. H01M 4/60
[52] U.S. Cl. ..................................... 429/192; 429/213
[58] Field of Search ........................... 429/192, 213, 33

[56] References Cited

U.S. PATENT DOCUMENTS

| | | | |
|---|---|---|---|
| 4,366,216 | 12/1982 | McGinness | 429/213 |
| 4,380,575 | 4/1983 | Nakamura et al. | 429/13 |
| 4,594,297 | 6/1986 | Polak et al. | 429/13 |
| 4,847,174 | 7/1989 | Palmer et al. | 429/192 X |

Primary Examiner—Stephen Kalafut
Attorney, Agent, or Firm—Mark M. Friedman

[57] ABSTRACT

An all solid state battery power source which operates efficiently at room temperature. The battery includes (1) a solid state protonic conductor electrolyte, (2) an anode active material based on an aromatic organic compound capable of producing protons and electrons in an anodic reaction during battery discharge, and (3) a solid cathode capable of reacting with protons. Anode and cathode active materials can be chosen so that the battery has the feature that the electrochemical reactions at the anode and cathode are at least partially reversible. It is suitable for electronic consumer products, biomedical applications, electric vehicle applications, and the like. The battery can be fabricated in any desired shape without any special production precautions.

18 Claims, 1 Drawing Sheet

5,382,481

SOLID STATE ELECTROCHEMICAL CELL CONTAINING A PROTON-DONATING AROMATIC COMPOUND

FIELD AND BACKGROUND OF THE INVENTION

This invention relates to electrochemical cells which are used as battery power sources by converting chemical energy to electrical energy. More particularly, this invention relates to batteries which accomplish the conversion of chemical energy to electrical energy by using a solid state protonic conductor electrolyte.

Rechargeable batteries have been developed which contain a solid rather than liquid electrolyte, since these exhibit practical advantages such as avoidance of fluid leakage or drying out. However, such batteries generally employ electrodes composed of metals, such as palladium (see for example U.S. Pat. No. 4,894,301), which are expensive or metal alloys which may be dangerous to health and difficult to manufacture.

SUMMARY OF THE INVENTION

The invention serves to provide a battery containing a solid proton conductor electrolyte, in which there is employed an anode free of metal and metal alloys and which contains a proton-donating aromatic compound, thus achieving the advantages of solid electrolytes and avoiding the disadvantages of metal-containing anodes.

Thus, in accordance with the invention, there is provided a battery comprising an anode, a cathode and a solid state electrolyte between, and in contact with, the anode and cathode, wherein: (a) the anode includes a material composed of a proton-donating aromatic compound which donates protons during discharge of the battery and accepts protons during charging of the battery via reactions involving the formation and breakage of inter-atomic bonds in the aromatic compound; (b) the cathode includes a proton-accepting compound which accepts protons during cell discharge when the anode releases protons via reactions involving the formation and breakage of inter-atomic bonds in the aromatic compound and releases protons during cell charging when the anode accepts protons via reactions involving the formation and breakage of inter-atomic bonds in the aromatic compound; and (c) the electrolyte is a solid state proton-conducting material for transporting protons between the anode and the cathode during cell discharge and charge when the anode reacts in reactions involving the formation and breakage of inter-atomic bonds in the aromatic compound.

In an electrochemically rechargeable version of an electrochemical cell according to the present invention the anode and cathode active materials are specifically chosen so that the solid cathode active component reacts at least partially reversibly with the hydrogen ions and the solid anode and active component is capable of providing hydrogen ions in an electrochemical reaction to produce electrical energy during battery discharge and to accept at least a partial amount of hydrogen ions during battery charging of those which were produced during discharge.

While electrochemical reactions involving the reversible dissociation of hydroquinone into quinone, protons and electrons and methylene blue oxidized to yield a proton and an electron are known, these reactions have been carried out using the hydroquinone or methylene blue as dissolved substances in a liquid electrolyte. The application of hydroquinone and other similar hydroxy-containing aromatic groups and methylene blue and other similar proton-donating aromatic compounds in electrochemical reactions using a solid electrolyte as the proton-conducting medium, and especially in solid state battery applications, are not known in the prior art.

In conventional batteries based on proton reactions, such as nickel/metal hydride cells, hydrogen is stored as a hydride in a hydrogen storage alloy or hydrogen storage metal and converted to protons in an electrochemical reaction. The protons are transferred to the cathode in a liquid electrolyte.

Many of the aromatic hydrogen redox materials are known as redox couples which are dissolved in aqueous or non-aqueous electrolytes. In the present invention, a distinguishing feature is that they are used as a hydrogen ion source in the solid state and the protons are transported in a solid state proton conductor electrolyte.

The aromatic hydrogen ion source materials of the present invention are distinct from previously known hydrogen storage compounds such as $PdH_x$ (U.S. Pat. No. 4,894,301) and metal alloy hydrides such as $LaNi_{4.7}Al_{0.3}$ (J. Electrochem. Soc., vol. 134, 1987, p. 558, T. Sakai, et al.), or $MnNi_{3.5}Co_{0.7}Al_{0.8}$ (Mm=mischmetal, composition on atomic percent: La-25.4, Ce-53.6, Pr-5.4, Nd-15.6, J. Electrochem. Soc., vol. 139, 1992, p. 172, N. Kuriyama, et al.). Similar effective compositions are also known such as $MmNi_{3.6}Co_{0.7}Al_{0.3}$ and alloys containing V, Ni, Ti, Zr and Co in various stoichiometries (U.S. Pat. No. 5,135,589). The prior art electrodes have the disadvantages of using expensive metals such as Pd, or dangerous metals to heath like Ni and Co, or rare earth metals. Another disadvantage is the complicated metallurgy and manufacturing expense required to arrive at the proper composition of the metal alloy hydrogen storage electrodes. In addition, the prior art hydride electrodes are used in batteries which use a liquid electrolyte, typically aqueous KOH solutions.

Some other of the disadvantages (see, for instance, A. Visintin, in Electrochem. Soc., vol. 139, 1992, p. 985) of the current metal/hydride batteries are their high self-discharge rate and low volumetric energy density. In addition, since they have within partial pressures of hydrogen gas, they could pose a safety hazard. Also, cell assembly is complicated and made expensive since they may be pressurized and in some cases operate with internal pressures of 30–50 atmospheres.

The present invention possesses advantages over the conventional metal/hydride battery. For instance, since there is no liquid electrolyte in a cell according to the present invention, there is no problem of cell leakage or drying out and no separators between the electrodes are required. Also, the cell operates at atmospheric pressure so cell design and assembly is less expensive, simpler and safer. Also, since the cell contains no hydrogen gas, the cell is inherently safer.

Other advantages include safer operation, the elimination of expensive hydrogen storage materials and the elimination of the need for loading the metal hydride under hydrogen pressure as in prior art technology.

BRIEF DESCRIPTION OF THE DRAWINGS

The invention is herein described, by way of example only, with reference to the accompanying drawing, wherein the sole FIGURE schematically depicts in cross-sectional view a battery according to the present invention showing an anode 10, a cathode 12 and an electrolyte 14, as well as a pair of leads 16 and 18 and, optionally, a pair of conducting plates 20 and 22.

DESCRIPTION OF THE PREFERRED EMBODIMENTS

Figure 1:
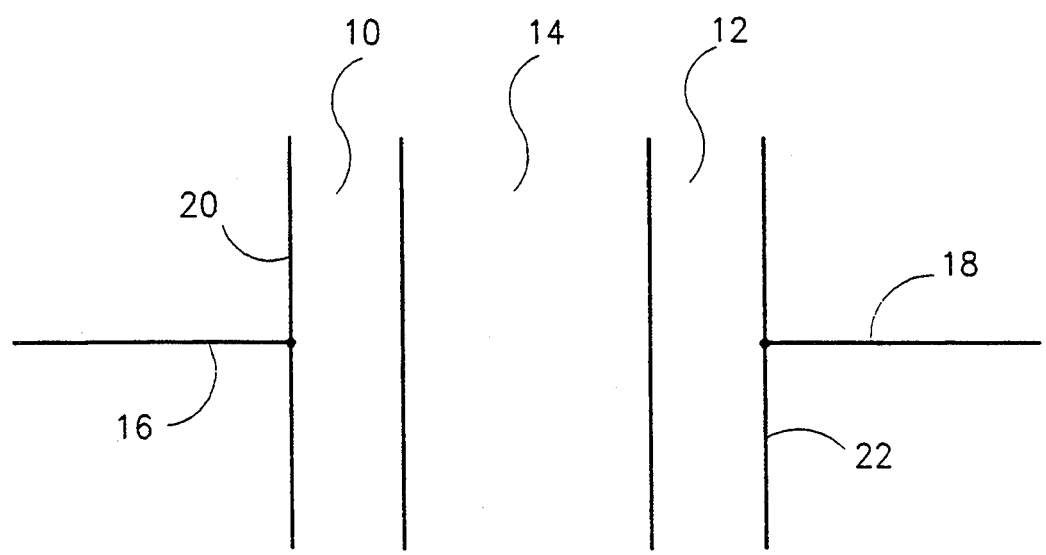

The proton-donating anode material employed in accordance with the invention is an aromatic compound. The theoretical capacity of the anodic aromatic material will depend on its molecular weight and the number of active hydrogen ion sites. An active hydrogen ion site in this invention is represented, for example, by a hydroxy group (except for methylene blue). Depending on the end-use applications, the choice of anode and cathode active materials, and the type of electronic conductive electrode additives, can be chosen to best meet the requirements of the particular application of the invention.

Beside methylene blue, the various possible compounds are cyclic aromatic hydrocarbons with attached hydroxy groups which may, in addition, feature additional functional groups. Furthermore, one or more carbons in the rings may be substituted with other constituents, such as nitrogen or oxygen.

Certain of the compounds feature a benzene ring. For example, mono-hydroxy derivatives such as hydroquinone monomethyl ether, hydroxy acetophenone, hydroxybenzaldehyde, hydroxy benzoic acid, hydroxybenzonitrile, acetaminophen, hydroxybenzyl alcohol, hydroxycinnamic acid and methylparabin; di-hydroxy derivatives, such as 1,4-dihydroxy benzene (hydroquinone), 3-hydroxy tyramine (dopamine), and co-enzyme, co-enzyme $Q_n$ where n is the length of the isoprenoid chain attached to the benzoid ring and can take on values in the range of from 0 to 10; tri-hydroxy derivatives such as 1,2,3-trihydroxy benzene (pyrogallol) and 1,3,5-trihydroxy benzene (phloroglucinol); and tetrahydroxy benzene derivatives such as tetrahydroxy-1,4-benzoquinone.

Other of the compounds are condensed or fused polycyclic aromatic in which adjacent rings share two carbons. For example, bi-cyclic naphthalene derivatives such as mono-hydroxy derivatives like naphthols and hydroxy-1,4-naphthoquinone, di-hydroxy derivatives such as naphthalene diols and penta-hydroxy naphthoquinones such as echinochrome. Other examples are tri-cyclic anthracene derivatives such as mono-hydroxy derivatives like anthranol and hydroxy anthraquinone, dihydroxy derivatives like anthralin, anthrarufin, alizarin and di-hydroxyanthraquinone, tri-hydroxy derivatives like anthrobin, anthragallol, purpurin and 1,8,9-anthracenetriol, and tetra-hydroxy derivatives like 1,2,5,8-tetrahydroxyanthraquinone and carminic acid. Still other examples are bi-cyclic derivatives such as purpogallin.

Further compounds are biaryls, benzoid compounds in which benzene rings or condensed systems are attached by a bond, such as hydroxybenzophenone, hydroquinone monobenzylether, hydroxy biphenyl, methylenedigallic acid and methylenedisalicyclic acid, or compounds having an oxygen substituting for a carbon in an aromatic ring like 5-hydroxy-2(5H)-furanone, hydroxycourmarin and fustin, or a nitrogen substituted aromatic ring like the multi-cyclic hydroxindole, tetrahydro papaveroline and hydroxyjulolidine and the single-ringed N-hydroxymaleimide, citrazinic acid and hydroxy methyl pyridine.

Methylene blue is a known redox material which reacts reversibly with protons in electrochemical redox reactions. The successful use of methylene blue as an anode material (see Example 7 below) teaches that the reversible redox of protons in a solid state battery according to the present invention is not limited to hydroxy-substituted aromatic compounds such as those listed above but is a broader behavior of several types of aromatic proton-donating materials.

It is to be understood that the aforementioned listing of aromatic organic compounds for the solid state anode is only representative of the class of hydrogen ion sources which are contemplated for use as the active aromatic organic material in the anode of the present invention. Any solid substances capable of acting as a source of protons in an electrochemical reaction at the anode of a battery power source for conversion of chemical energy to electrical energy may be used as the active component for the anode in such a battery.

The cathode may be made from one or more of a number of materials including but not limited to, $WO_3$, transition metal dioxides $MO_2$ (where M=Mn, Mo, Ir, Cr, Ti, Nb, V, or W), $V_2O_3$ and related vanadium oxides, NiOOH, $(CF)_x$, $(C_2F)_x$ and naphthalene.

The cathode materials are not specifically defined and are available in different grades with various levels of activity, purity, chemical and physical characteristics, and prepared by a variety of methods.

It is a property of the solid state protonic conductor electrolyte used in the present invention to pass hydrogen ions and to have high protonic conductivity especially at room and ambient temperature. The electrolyte should also be at least partially stable towards the components of the anode, cathode and current collector.

It is known from the prior art that rechargeable batteries have been developed which contain a solid proton-conducting electrolyte rather than a liquid electrolyte. Such solid state batteries exhibit practical advantages such as avoidance of fluid leakage or drying out, no need for a separator between the electrodes, and lend themselves to be constructed into various shapes and flexible designs with simpler manufacturing technologies possible as compared to liquid electrolyte cells. Furthermore, solid state electrolyte batteries are generally considered to have good shelf life and storage stability.

The solid electrolyte of the present invention is a solid state proton conductor, such as a heteropoly acid, for example, molybdophosphoric acid (MPA) or tungstophosphoric acid (TPA) or salts thereof or their respective hydrates at various states of hydration or mixtures of these. Other examples of suitable heteropoly acids are referred to in U.S. Pat. Nos. 4,024,036 and 4,594,297 which are incorporated by reference as if fully set forth herein. Some properties of MPA and TPA are described in Chemistry Letters, pp. 17-18, 1979, O. Nakamura, et al.

It is to be understood that the aforementioned listing of solid state protonic conductors are only representative of the class of solid protonic conductors which are contemplated to be employed as the solid state proton-conducting electrolyte in the present invention. In addition, besides incorporating the solid electrolyte in raw form in the battery, it can be processed into gel form by using various gelling agents such as silica gels (see, Solid State Ionics 59 (1993) p. 171, M. Tatasumisago, et al.), or used in a polymer blend as in U.S. Pat. No.

4,594,297, or processed according to the methods given in the Examples below.

It is known from the prior art that a number of solid state proton conductors exist and some have been used in battery applications. MPA and TPA are among the highest conductivity solid state protonic conductors at room temperature. It is important to note that the prior art teachings of heteropoly acids refers only to their use in fuel cells. There is no prior art for their application in battery power sources.

In a preferred embodiment of the invention, the anode and the cathode each further contains a non-metallic electrically conductive material, for example graphite or carbon black, and a solid state proton-conducting material such as a heteropoly acid, for example molybdophosphoric acid. Preferably, the proton-conducting material present in the anode and cathode is the same as that comprising the solid electrolyte.

The solid state rechargeable batteries of the invention can easily be fabricated at ambient temperatures without any special precautions with regard to low humidity or oxygen-free atmospheres. They can be made by, for example, pressing or printing in thin layers as by silk screening or computer designed priming. The battery may be made in any desired size and shape and several cells may be fabricated in series, in which case adjacent cells can be separated by a non-metallic end plate, preferably a graphite or carbon black end plate, since this will not be attacked by the solid heteropoly acid electrolyte.

When, after use, the battery has become discharged, recharging of the battery can be effected by applying an appropriate voltage or current across the cell.

The following non-limitative Examples illustrate the invention.

EXAMPLE 1

An anode mix was prepared by first mixing and grinding together at room temperature 0.5 g of graphite powder and 2.0 g of hydroquinone until a homogeneous mixture was obtained (A-1). To 0.105 g of A-1 were then added 150 mg of molybdophosphoric acid (MPA) powder to give a mixture (A-1-M) consisting by weight of 33% hydroquinone, 59% MPA and 8% graphite.

A cathode mix was prepared by first mixing and grinding together at room temperature 277 mg of graphite and 2.464 g of $MnO_2$ until a homogeneous mixture was obtained (C-1). To 0.106 g of C-1 were then added 148 mg of 38% $MnO_2$, 58% MPA and 4% graphite.

A battery cell was constructed by pressing in a cylindrical pellet die of 13 mm diameter made from an electrically insulating sleeve of polymethylmethacrylate plastics material and 316 stainless steel pellets. The insulating sleeve was necessary to prevent shorting out during pressing.

A first stainless steel pellet was loaded into the sleeve and a first 0.2 mm thick graphite sheet was then placed into the die to avoid contact between the MPA and the steel pellet and to provide a good surface for electrical contact to the external circuit. 0.124 g of A-1-M powder was then placed in the die on top of the graphite sheet. A second steel pellet was placed on top of the anode mix, which was then lightly pressed by hand. The second steel pellet was then removed and 0.277 g of MPA was added to completely cover the lightly pressed anode mix. The MPA was lightly pressed on to the anode mix using the steel pellet which was again removed and 0.124 g of cathode mix C-1-M was added to completely cover the lightly pressed MPA electrolyte layer. A second graphite sheet identical to the first sheet was then placed in the die on top of the C-1-M mix and the second steel pellet was placed on top of the graphite sheet and the entire cell heavily pressed in a vice. The resulting composite pellet consisted of five distinct layers: graphite sheet, A-1-M, MPA, C-1-M, and graphite sheet. This composite pellet was easily and cleanly removed from the press die as a single unit and was ready for use.

The battery cell made in the foregoing manner had an open circuit potential of +0.584 volts (close to the theoretical voltage for the hydroquinone/quinone: $MnO_2$ couple in acid electrolyte of +0.551 volts). This is a good indication that the following reactions occur in the cell:

anode: $H_2Q \longleftrightarrow Q + 2H + 2e^-$ cathode: $MnO_2 + H^+ + e^- \longleftrightarrow MnOOH$ where $H_2Q$ represents hydroquinone and Q represents quinone. The battery cell was then discharged for 17 hours on a resistive load of 8 kiloohms. The working voltage remained above +0.4 volts during this time. The cell was then charged by 1.550 volts dropped across a 100 kiloohm resistor for 8 hours. At the end of charging the voltage was about +0.726 volts. The cell was then discharged in the same resistive load for 15 hours and then recharged for six days to a voltage of +1.018 volts, following which it was again discharged for a third time on the same resistive load.

EXAMPLE 2

A three cell bipolar battery was constructed using the same procedure as in Example 1. The anode mix (A-2-M) consisted of 350 mg A-1 mixed with 150 mg of MPA. Thus, the A-2-M mix contained by weight 56% HQ, 14% graphite and 30% MPA.

The cathode mix (C-2-M) consisted of 350 mg of C-1 mixed with 150 mg of MPA. Thus the C-2-N mix consisted by weight of 63% $MnO_2$, 7% graphite and 30% MPA. The order of the construction was the same as in Example 1. After the graphite sheet had been placed on top of the C-2-M mix, the order was repeated twice more in order to build a three cell battery in the plastic die. The graphite sheets between the cells acted as a bipolar current collector.

The open circuit voltage of the battery was +1.66 volts, or +0.553 volts per cell. This battery was discharged and charged as in Example 1.

EXAMPLE 3

This Example illustrates how the cell components can be screen-printed instead of being formed as pressed powders. A mixture was formed from 6 g of white plastic glue, 2 g of deionized water, 0.4 g of carbon powder and 3.5 g of $MnO_2$ powder until homogeneous. This mixture was then spread on a polyester sheet as a thin layer and allowed to dry in air at room temperature for about half an hour. The resulting electrode was peeled off the polyester sheet and was found to have a resistivity of 5–12 ohms per square centimeter across its thickness of about 0.1 mm.

In place of the white plastic glue, other glues and epoxy resins can be used. Graphite, or other types of conductive additives, can be used instead of, or in addition to, the carbon.

EXAMPLE 4

Electrodes were prepared as in Example 3 using 7 g of white plastic glue, 3 g of deionized water, 1 g of $MnO_2$ and 0.8 g of carbon. The resulting electrode had a thickness resistivity of 1–2 ohms per square centimeter across its thickness of about 0.1 mm.

EXAMPLE 5

Using the procedure described in Example 1, two cells were constructed using a cathode mix consisting by weight of 36% $WO_3$, 6% graphite and 58% solid MPA. The remainder of the cell was as in Example 1. The open circuit voltages of the two cells were 0.098 and 0.120 volts, respectively. The cells showed only slight polarization on a 150 ohm load indicating that the system had good rate capability. This Example particularly shows that the hydroquinone anode mix is a high rate electrode and that the MPA is capable of supporting large currents. The reaction at the cathode in this Example was:

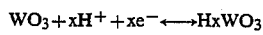

$$WO_3 + xH^+ + xe^- \longleftrightarrow H_xWO_3$$

EXAMPLE 6

The procedure of Example 1 was repeated substituting carbon black for the graphite in the cathode mix. This provided a cell with a flatter discharge voltage profile than in comparable cells using graphite as the conductive additive in the cathode mix. The same weight per cent in the composition of $MnO_2$ and MPA electrolyte was used as in Example 1 giving: 38% $MnO_2$, 4% carbon black and 58% MPA. The remainder of the cell had an open circuit voltage of 0.533 volts. During discharge on the same drain as in Example 1, the voltage curve profile was flatter than cells containing graphite in the cathode mix. A flatter profile has the desirable properties of lower cell polarization, greater energy density and higher average voltage. When discharge had been terminated, the cell was recharged using the same conditions as in Example 1.

EXAMPLE 7

A cell was produced substituting the hydroquinone in the anode mix by methylene blue (MB). The composition of the anode mix in weight per cent was: 28% MB, 14% graphite and 58% MPA. The remainder of the cell was as described in Example 1. The open circuit voltage of the cell was 0.483 volts. The cell was discharged and charged using the conditions of Example 1.

EXAMPLE 8

A cell was produced using acetaminophen in place of hydroquinone. A mixture consisting of 75 weight per cent acetaminophen and 25% of providone, starch and stearic acid (mixture X). Mixture X was blended with graphite and MPA solid electrolyte in the following weight per cent: X 33%, graphite 8% and MPA 59%. The resulting anode mix was used as the anode in a cell constructed in the manner described in Example 1. The open circuit voltage of this cell was 0.423 volts. The cell was capable of being discharged using the conditions of Example 1.

EXAMPLE 9

In this Example the cell composition was the same as in Example 1, but instead of circular pellets, the powders were compacted in layer form between graphite sheets into an asymmetric shape, which had the advantage that it could be inserted with only one side (that is polarity) into the receiving form. This is useful because it prevents mistakes in the orientation of the polarity of the battery on the device in which the battery is to be used. It is also useful since asymmetric receiving forms can be designed to receive battery power sources. The discharge behavior of this cell was the same as the cell of Example 1. When discharge had terminated, the cell was charged at much higher currents than in Example 1, the charging voltage being 1.521 volts dropped across a 22 kiloohm resistor. The cell was able to accept this fast charge mode and thereafter be usefully discharged.

EXAMPLE 10

In this Example 800 mg of hydroquinone were dissolved in 10 cc of deionized water containing 1.4 g of MPA. The pH of the plain MPA solution was about 1. Upon the addition of the hydroquinone, the solution turned from its yellowish color to dark greenish blue. 8 cc more of deionized water were added to this solution which was then heated on a hot plate at 37° C. with stirring. When nearly all of the water had evaporated, the stirring was terminated and the solution was allowed to dry to completion. The resulting dry material (Y) was dark blue. An anode mix containing in weight per cent: 33% Y, 8% graphite and 59% MPA, was used to construct a cell as in Example 1. This cell had an open circuit voltage of 0.455 volts and was usefully discharged under the conditions described in Example 1.

EXAMPLE 11

A battery cell was constructed as in Example 1, except that in the cathode mix, the $MnO_2$ was replaced by naphthalene. The open circuit voltage of the resulting cell was about 0.185 volts.

EXAMPLE 12

A cell was constructed using the anode, electrolyte and cathode compositions as in Example 1, but the graphite foil end plate, anode mix, electrolyte, cathode mix and graphite foil end plate were pressed sequentially inside a flexible plastic tube to form a bipolar battery. The bipolar current collector was the graphite foil as in Example 2. In this manner, a multi-cell battery was constructed having an open circuit voltage which was the sum of the individual cell voltages. In this way batteries with voltages of greater than 2 volts were prepared. Individual cell voltages were of the order of 0.565 volts. The advantage of using a flexible plastic tube for the battery housing was that the battery was flexible.

EXAMPLE 13

A flexible tube battery was assembled as in Example 12, except that the cathode mix was replaced by the naphthalene cathode mix of Example 11. A bipolar battery was obtained, the open circuit voltage of which was the sum of the individual cells.

EXAMPLE 14

A battery cell was constructed as in Example 1, except that the molybdophosphoric acid (MPA) was replaced by tungstophosphoric acid (TPA) in the anode and cathode mixes and solid electrolyte. The weight per cent composition in the anode and cathode mixes was the same, but the amount of TPA used for the electrolyte was 493 mg. The open circuit voltage of this cell was 0.591. It was discharged using the same conditions as in Example 1 to provide useful energy.

While the invention has been described with respect to a limited number of embodiments, it will be appreciated that many variations, modifications and other applications of the invention may be made.

What is claimed is:

1. A battery comprising an anode, a cathode and a solid state electrolyte between, and in contact with, the anode and cathode, wherein:
   (a) the anode includes a material composed of a proton-donating aromatic compound which donates protons during discharge of the battery and accepts protons during charging of the battery via reactions involving the formation and breakage of inter-atomic bonds in the aromatic compound;
   (b) the cathode includes a proton-accepting compound which accepts protons during cell discharge when the anode releases protons via reactions involving the formation and breakage of inter-atomic bonds in the aromatic compound and releases protons during cell charging when the anode accepts protons via reactions involving the formation and breakage of inter-atomic bonds in the aromatic compound; and
   (c) the electrolyte is a solid state proton-conducting material for transporting protons between the anode and the cathode during cell discharge and charge when the anode reacts in reactions involving the formation and breakage of inter-atomic bonds in the aromatic compound.

2. A battery as in claim 1, wherein the anode is selected from the group consisting of hydroquinone, phloroglucinol, echinochrome, 1,2,5,8-tetrahydroxyanthraquinone, purpogallin, methylenedigallic acid, methylene blue, tetrahydroquinone, hydroxy acetophenone, acetaminophen, hydroxybenzyl alcohol, dopamine, pyrogallol, naphthols, anthranol, anthrarufin, anthrobin, purpurin, tetrahydroxybenzophenone, $Q_n$, where n is the length of the isoprenoid chain attached to the benzoid ring, hydroquinone monomethyl ether, citrazinic acid, hydroxybenzophenone, hydroxy biphenyl, tetrahydro papaveroline, fustin, hydroquinone monobenzylether and hydroxymethyl pyridine.

3. A battery as in claim 1, wherein the anode is selected from the group consisting of hydroquinone, phloroglucinol, echinochrome, 1,2,5,8-tetrahydroxyanthraquinone, purpogallin, methylenedigallic acid, methylene blue, tetrahydroquninone, hydroxy acetophenone, acetaminophen, hydroxybenzyl alcohol, dopamine, pyrogallol, naphthols, anthranol, anthrarufin, anthrobin, purpurin, tetrahydroxybenzophenone, and $Q_n$, where n is the length of the isoprenoid chain attached to the benzoid ring.

4. A battery as in claim 1, wherein the anode is selected from the group consisting of hydroquinone, phloroglucinol, echinochrome, 1,2,5,8-tetrahydroxyanthraquinone, purpogallin, methylenedigallic acid, tetrahydroquinone and methylene blue.

5. A battery as in claim 1, wherein the anode is selected from the group consisting of hydroquinone, methylene blue and acetaminophen.

6. A battery as in claim 1, wherein the cathode includes a compound selected from the groups consisting of metal oxides, $(CF)_x$, $(C_2F)_x$, NiOOH and naphthalene as the proton-accepting compound.

7. A battery as in claim 1, wherein the cathode includes $(CF)_x$.

8. A battery as in claim 1, wherein the cathode includes a transition metal dioxide.

9. A battery as in claim 8, wherein said transition metal dioxide is manganese dioxide.

10. A battery as in claim 1, wherein the anode further contains a non-metallic electrically conductive material.

11. A battery as in claim 1, wherein the anode further contains a proton-conducting material.

12. A battery as in claim 1, wherein the cathode further contains a non-metallic electrically conductive material.

13. A battery as in claim 1, wherein the cathode further contains a proton-conducting material.

14. A battery as in claim 10 wherein said non-metallic electrically conductive material is selected from the group consisting of graphite and carbon black.

15. A battery as in claim 12 wherein said non-metallic electrically conductive material is selected from the group consisting of graphite and carbon black.

16. A battery as in claim 1, wherein said proton-conducting material includes a heteropoly acid.

17. A battery as in claim 16, wherein said heteropoly acid is selected from the group consisting of molybdophosphoric acid and tungstophosphoric acid.

18. A battery as in claim 1, wherein the cathode includes manganese dioxide, carbon and molybdophosphoric acid, wherein the anode includes hydroquinone, carbon and molybdophosphoric acid, and wherein the electrolyte includes molybdophosphoric acid.

* * * * *